(12) United States Patent
Rath et al.

(10) Patent No.: US 6,649,695 B1
(45) Date of Patent: Nov. 18, 2003

(54) ELASTIC SEALING MATERIAL ON THE BASIS OF BLOCK COPOLYMERS MADE OF ISOBUTENE AND VINYL AROMATIC MONOMERS

(75) Inventors: Hans Peter Rath, Grünstadt (DE); Arno Lange, Bad Dürkheim (DE); Helmut Mach, Heidelberg (DE); Konrad Knoll, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/048,833

(22) PCT Filed: Aug. 8, 2000

(86) PCT No.: PCT/EP00/07705

§ 371 (c)(1),
(2), (4) Date: Feb. 6, 2002

(87) PCT Pub. No.: WO01/10969

PCT Pub. Date: Feb. 15, 2001

(30) Foreign Application Priority Data

Aug. 9, 1999 (DE) .......................................... 199 37 562

(51) Int. Cl.⁷ ............................................. C08F 255/10
(52) U.S. Cl. ........................... 525/95; 525/191; 525/244
(58) Field of Search ............................ 525/95, 191, 244

(56) References Cited

U.S. PATENT DOCUMENTS

| | | | |
|---|---|---|---|
| 4,946,899 A | 8/1990 | Kennedy et al. | 525/244 |
| 5,934,503 A | 8/1999 | Shachi et al. | 221/154 |
| 6,140,418 A | 10/2000 | Yamashita et al. | 525/88 |

FOREIGN PATENT DOCUMENTS

| | | |
|---|---|---|
| CA | 2258585 | 12/1997 |
| CA | 2226459 | 7/1998 |
| WO | WO 98/30649 | 7/1998 |

*Primary Examiner*—James J. Seidleck
*Assistant Examiner*—Olga Asinovsky
(74) *Attorney, Agent, or Firm*—Keil & Weinkauf

(57) ABSTRACT

Linear or star block copolymers which have at least one polymer block A which is essentially composed of isobutene units and at least two polymer blocks B which are essentially composed of units which are derived from vinylaromatic monomers are used as resilient sealing material. In particular, such sealing materials are used for sealing the edge joints in insulation glass panes, and insulation glass panes have a flexible edge joint seal which contains one of the block copolymers.

6 Claims, 1 Drawing Sheet

Figure 1: Section through the edge of an insulation glass pane
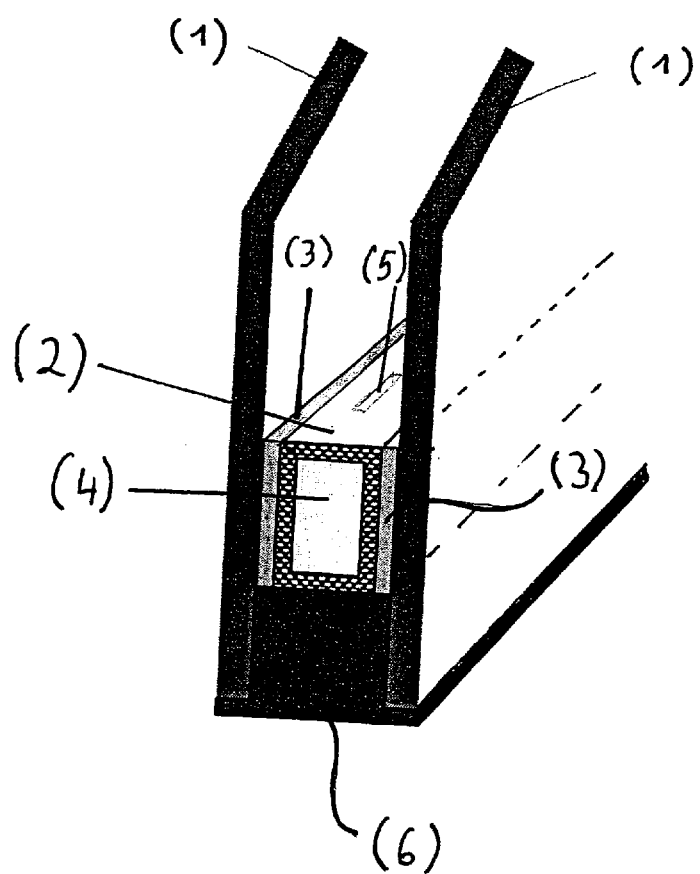

ELASTIC SEALING MATERIAL ON THE BASIS OF BLOCK COPOLYMERS MADE OF ISOBUTENE AND VINYL AROMATIC MONOMERS

The present invention relates to the use of block copolymers comprising polymer blocks A which are essentially composed of isobutene and polymer blocks B which are essentially composed of units which-are derived from vinylaromatic monomers, as resilient sealing materials.

Flexible sealing materials, also referred to as sealing compounds, are used, for example, for sealing joints. Typical sealing compounds consist of polysulfide, butyl rubber, silicones or resilient polyurethanes. Depending on the use, the sealing materials must fulfill stringent requirements. They may not lose their resilience under extreme temperature variations and may not become brittle, especially at low temperatures. At the same time, high mechanical strength is often desired. Furthermore, the sealing materials should be stable to the effects of weathering and/or to chemicals, for example to household cleaners. For a number of applications, in particular extremely low gas permeability, in particular to air, argon and water vapor, is required.

For example, sealing materials having high resilience and mechanical strength in combination with low gas permeability are required for the production of insulation glass windows. Insulation glass windows consist as a rule of two or more glass panes which are kept apart by spacers, for example by aluminum rails or hollow aluminum profiles. The space between the individual glass panes is as a rule filled with a gas, for example argon or sulfur hexafluoride, for better insulation. The joints between the individual glass panes, in particular the joints between the aluminum profiles and the glass panes, must be sealed with a sealing material which, on the one hand, prevents the escape of the insulating gas and, on the other hand, prevents penetration of atmospheric humidity, i.e. air and water vapor, into the space between the glass panes.

The prior art solves the problem by adhesively bonding the aluminum profiles acting as spacers to the glass panes by means of a layer of polyisobutene which simultaneously acts as a sealing compound. In this way, high gastightness is achieved. However, this type of seal does not result in sufficient mechanical strength of the composite pane and is sensitive to mechanical damage. In the prior art, this structure is therefore covered with a further sealing compound having higher mechanical strength. For example, cold-crosslinkable or hot-crosslinkable sealing materials comprising polysulfide, butyl rubber, silicones or polyurethanes are suitable for this purpose. The use of two sealing materials makes the application of such seals more expensive and thus increases the production costs for insulation glazing. In addition, such sealing materials have only insufficient gas impermeability.

It is an object of the present invention to provide a flexible sealing material which is impermeable to gases such as argon or water vapor and at the same time has high resilience in combination with sufficient mechanical strength.

We have found that this object is achieved and that, surprisingly, these requirements set for sealing materials are fulfilled by block copolymers which contain at least one polymer block A which is composed of isobutene units and at least two further polymer blocks B which are composed of units which are derived from vinylaromatic monomers.

The present invention accordingly relates to the use of linear or star block copolymers which have at least one polymer block A which is essentially composed of isobutene units and at least two polymer blocks B which are essentially composed of units which are derived from vinylaromatic monomers, as resilient sealing material.

Block copolymers based on isobutene and vinylaromatic monomers and processes for their preparation are known from the prior art (cf. for example U.S. Pat. No. 4,946,899 and literature stated therein).

Both linear block copolymers, for example of the type B-A-B or $(A-B-)_k A$, where $k \geq 2$, and star block copolymers are suitable for the use according to the invention. Among these, those block copolymers which have a central polymer block which is essentially composed of isobutene units are preferred. Such block copolymers having a central polyisobutene block are of the formula I

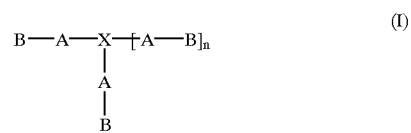

where
A is a polymer block A according to the above definition,
B is a polymer block B according to the above definition,
n is 0, 1 or 2 and
X is a single bond or an n+2-valent hydrocarbon radical of up to 30 carbon atoms.

If X is an n+2-valent hydrocarbon radical, this is a consequence of the preparation and results from the respective polymerization initiator. Together with the polymers blocks A surrounding it, it forms the central polymer block which is essentially composed of isobutene units.

According to the invention, the block copolymer contains at least one polymer block A which is essentially composed of isobutene units. Some of the isobutene units in the polymer blocks may also be replaced by monoolefinically unsaturated monomers having silyl groups. Typical silyl groups are trialkoxysilyl groups in which the alkoxy radical has, as a rule, 1, 2, 3 or 4 carbon atoms and may in turn be substituted by $C_1-C_4$-alkoxy. Examples of such radicals are trimethoxysilyl, triethoxysilyl, tri-n-propoxysilyl and tri(methoxyethyl)silyl. The polymer blocks A then preferably contain up to 20, for example from 0.1 to 20, in particular from 0.5 to 10, % by weight, based on the total weight of all polymer blocks A in the block copolymer, of such monomers as polymerized units. Examples of monoolefinically unsaturated monomers having trialkoxysilyl groups are in particular $C_2-C_{10}$-monoolefins which are substituted by a tri-$C_1-C_4$-alkoxysilyl group: these include trialkoxysilyl-substituted ethene, propene, n-butene, isobutene, n-pentene, 2-methyl-1-butene or 2-methyl-1-pentene. Examples of such monomers are: 1-(trimethoxysilyl)ethene, 1-(trimethoxysilyl)propene, 1-(trimethylsilyl)-2-methyl-2-propene, 1-(tri(methoxyethoxy)silyl)ethene, 1-(tri(methoxyethoxy)silyl)propene, 1-(tri(methoxyethoxy)silyl)-2-methyl-2-propene. Styrene derivatives which have one of the abovementioned trialkoxysilyl groups, for example 2-, 3- or 4-trimethoxysilylstyrene, or compounds of the type $CH_2=CH-C_6H_4-Q-Si(OCH_3)_3$, where Q is a bifunctional radical, for example a $C_1-C_{10}$-alkylene group, which may be interrupted by one or more, nonneighboring oxygen atoms or imino groups, e.g. $-CH_2-NH-C_2H_4-NH-C_3H_6-$, are also suitable. Such monomers derived from styrene may also be used for modifying the styrene block.

According to the invention, the block copolymer contains at least one further polymer block B which is composed of units which are derived from vinylaromatic monomers. Suitable vinylaromatic monomers are: styrene, α-methylstyrene, $C_1$–$C_4$-alkylstyrenes, such as 2-, 3- and 4-methylstyrene and 4-tert-butylstyrene, and 2-, 3- or 4-chlorostyrene. Preferred vinylaromatic monomers are styrene and 4-methylstyrene and mixtures thereof. A very particularly preferred vinylaromatic monomer is styrene, which may be replaced by up to 20% by weight of 4-methylstyrene.

In the formula II, X is preferably a 2- or 3-valent hydrocarbon radical of up to 30, preferably 5 to 20, carbon atoms. X links the polymer blocks A surrounding it and composed of isobutene to a central polymer block which is essentially composed of isobutene units. X is preferably one of the following radicals:

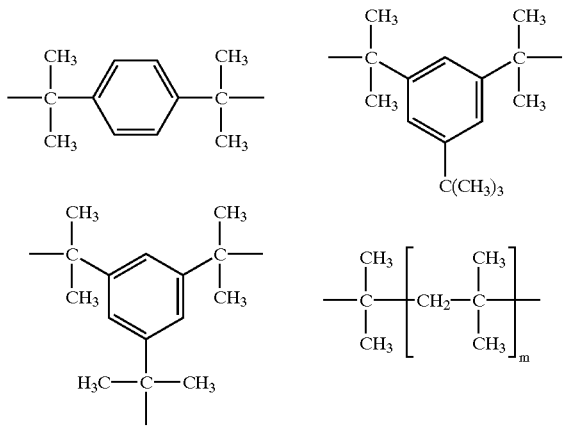

where m is 1, 2 or 3

The number-average molecular weight of the central polyisobutene block corresponds approximately to the sum of the number-average molecular weights of all polymer blocks A in formula I. This is as a rule from 20,000 to 100,000, preferably from 25,000 to 90,000, very particularly preferably from 30,000 to 80,000 daltons. The ratio of the total weight of all polymer blocks A to the total weight of all polymer blocks B is as a rule from 1:1 to 9:1, preferably from 1.2:1 to 4:1, in particular from 3:2 to 7:3.

In the interest of mechanical strength, it has proven advantageous if the polymer block or polymer blocks B which is or are composed of vinylaromatic monomers has or have a number-average molecular weight $M_n$ of at least 6000, in particular from 7000 to 20,000, daltons.

It has also proven advantageous if the polymer block or polymer blocks A has or have a narrow molecular weight distribution. The width of the molecular weight distribution can be characterized on the basis of the dispersity (ratio of weight-average molecular weight to number-average molecular weight $M_w/M_n$). The dispersity $M_w/M_n$ is preferably less than 1.4, in particular less than 1.3, particularly preferably less than 1.2.

All molecular weight data relate to values as determined by means of gel permeation chromatography (GPC). The gel permeation chromatography was carried out using THF as a mobile phase and $CS_2$ as reference, on two columns (length 300 mm, diameter 7.8 mm) connected in series, the first column being packed with Styragel HR5 (molecular weight range from 50,000 to $4\times10^6$) and the second column with Styragel HR3 (molecular weight range from 200 to 30,000) from Waters. The detection was carried out by means of a differential refractometer. Commercial polyisobutene standards in the molar mass range from 224 to 1,000,000, from Polymer-Standards Service, Mainz, Germany, were used as standards for determining the isobutene block. In the determination of the block copolymers, a polystyrene calibration file and a UV detector were additionally used.

The block copolymers used according to the invention can be prepared by the processes customary for the preparation of block copolymers. In a first process, a first polymer block which is essentially composed of isobutene units and which carries functional groups at its end is prepared by known processes, for example cationically initiated polymerization, and these functional groups are used as a starting point for the polymerization of the vinylaromatic monomers or as a linkage point to prepared blocks of vinylaromatic monomers which in turn carry functional groups on the terminal groups. For example, polymer blocks comprising isobutene units which carry halogen, e.g. chlorine, as a functional group at their end can be prepared by known processes. These halogen atoms can be metalated by known processes, for example by reaction with organometallic reagents, such as butyllithium, and serve as a starting point for an anionic polymerization of the vinylaromatic monomers.

In another preparation process, a polymer block which has functional groups which can be converted into cationic centers by Brönsted or Lewis acids is first prepared. The center then serves as a starting point for the cationically initiated polymerization of vinylaromatic monomers or of isobutene. Processes for this purpose are known in principle (cf. for example J. P. Kennedy et al. "Designed Polymers by Carbocationic Macromolecular Engineering", Carl Hanser-Verlag, Munich, Vienna, New York, Barcelona, pages 197 to 220). Polyisobutenes having functional terminal groups, for example with halogen, can be prepared, for example, by cationic polymerization of isobutenes. Processes for this purpose are likewise described in the prior art (cf. for example J. P. Kennedy et al., loc. cit. pages 167 to 195).

The block copolymers used according to the invention can moreover be prepared in a simple manner by sequential, cationically initiated polymerization, isobutene or a monomer mixture which essentially comprises isobutene first being polymerized under the conditions of a living cationic polymerization, and polymerization of the vinylaromatic monomers then being carried out under these conditions. Such a polymerization sequence is known in principle and was described, for example, by J. P. Kennedy et al. in U.S. Pat. No. 4,946,899 and Fodor et al. in J. Macromol. Sci.-Chem., A24 7 (1987), pages 735 to 747. For further details, the content of these publications is hereby incorporated in their entirety by reference.

In this process, isobutene is first reacted in the presence of a coinitiator, of a Lewis acid and, if required, of a compound having a free electron pair, under aprotic conditions.

In the simplest case, suitable coinitiators are monofunctional compounds of the formula R—Y, where R is a hydrocarbon radical and Y is a leaving group which can be activated by a Lewis acid. The presence of the Lewis acid results in elimination of the leaving group with formation of a positive charge or of positive polarization of the carbon atom in R to which the leaving group Y is bonded.

Examples of typical leaving groups are halogens, such as chlorine, bromine or iodine, in particular chlorine, linear or branched $C_1$–$C_6$-alkoxy groups, such as methoxy, ethoxy, n-propoxy, isopropoxy, n-butoxy, isobutoxy, sec-butoxy or tert-butoxy, and linear or branched $C_1$–$C_6$-acyloxy groups, such as acetoxy, propionyloxy, n-butyroxy, isobutyroxy, n-butylcarbonyloxy, isobutylcarbonyloxy or sec-butylcarbonyloxy or pivalyloxy. The leaving group Y is bonded to a carbon atom in the radical R which is capable of forming a stable carbocation or at least stabilizing a positive partial charge. Preferably, Y is therefore bonded to a secondary or in particular to a tertiary carbon atom. In particular, the carbon atom to which Y is bonded carries two methyl groups. The carbon atom to which Y is bonded preferably carries a group which is capable of stabilizing a cationic charge by mesomerism, for example a vinyl group or a phenyl group. Typical radicals R are n-butyl, isobutyl, sec-butyl, tert-butyl, 2,4-dimethylpent-2-yl, 2-vinylprop-2-yl and radicals which are derived from lower oligomers of isobutene and are of the formula

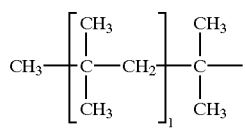

where 1 is 3, 4 or 5.

For the preparation of the block copolymers preferred according to the invention and having a central polymer block which is essentially composed of isobutene units, compounds which contain at least two functional leaving groups are used as coinitiators, i.e. compounds of the formula II

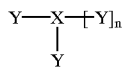

where X and n have the meanings stated above in connection with formula I and Y is a leaving group, preferably a leaving group stated in connection with R—Y. Here too, Y is preferably halogen, $C_1$–$C_6$-alkoxy or $C_1$–$C_6$-acyloxy, in particular chlorine, bromine, methoxy or acetoxy, chlorine being particularly preferred. Here too, Y is preferably bonded to a tertiary carbon atom. The tertiary carbon atom preferably has at least one methyl group and in particular two methyl groups. Preferably, this carbon atom carries a group which is capable of stabilizing a cationic charge by resonance, for example a vinyl or phenyl group. Examples of particularly preferred coinitiators are the compounds mentioned below:

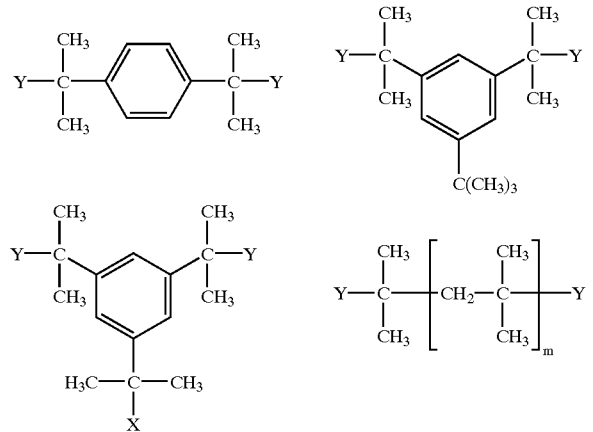

where m is 1, 2 or 3
where Y may be identical or different and have one of the abovementioned meanings. In these formulae, too, Y is preferably chlorine, bromine, methoxy or acetoxy, in particular chlorine.

The Lewis acids used for the preparation are as a rule compounds such as aluminum halides, titanium(IV) halides, boron halides, tin(IV) halides or zinc halides, in particular the chlorides. The abovementioned halides may also have an alkyl substituent instead of some of the halogen atoms. Examples of these are the mono- and dialkyl halides of boron and of aluminum, in particular the mono- and dialkyl chlorides. In the preparation to give higher molecular weights, pentafluorophenyl compounds of the abovementioned elements, in particular tris(pentafluorophenyl) borane, have also proven useful. Particularly preferred Lewis acids are titanium tetrachloride and boron trichloride, in particular titanium tetrachloride. In the preparation of the novel block copolymers, in particular in the polymerization of the isobutene block, the molar ratio of coinitiator to Lewis acid is from 2:1 to 1:50, preferably from 1:1 to 1:20, in particular from 1:2 to 1:10, based on the functional groups in the coinitiator.

It is known that the molecular weight of the polymer block first polymerized, which is composed of isobutene units, can be established by means of the ratio of isobutene to coinitiator. As a rule, the isobutene/coinitiator ratio is from 10,000:1 to 100:1, preferably from 5000:1 to 500:1.

In the preparation of the novel block copolymers by cationic polymerization, it has proven advantageous if a further, nonacidic compound having a free electron pair is added as a further cocatalyst to the polymerization mixture. Such compounds presumably form complexes with the Lewis acid under the polymerization conditions and thus regulate their reactivity. Examples of such compounds are dialkyl ethers, such as diisopropyl ether, cyclic ethers, such as tetrahydrofuran, trialkylamines such as triethylamine or diisopropylamine, amides, such as N,N-dimethylacetamide, $C_1$–$C_4$-alkyl esters of aliphatic $C_1$–$C_6$-carboxylic acids, such as ethyl acetate, dialkyl thioethers or alkylaryl thioethers, such as methyl phenyl sulfide, dialkyl sulfoxides, such as dimethyl sulfoxide, nitriles, such as acetonitrile, trialkylphosphines or triarylphosphines, such as trimethylphosphine, triethylphosphine, tri-n-butylphosphine and triphenylphosphine, pyridine or alkylpyridines. Particularly preferred among these are pyridine and sterically hindered pyridine derivatives. Sterically hindered pyridines are those which have sterically bulky alkyl groups at least in the 2- and 6-position of the pyridine ring, e.g. 2,6-diisopropylpyridine and 2,6-di-tert-butylpyridine. Sterically hindered pyridine derivatives presumably serve as proton traps and thus prevent protons from ubiquitous traces of water from initiating a further cationic polymerization.

A a rule, the cationic polymerization for the preparation of the novel block copolymers is carried out in a solvent. Suitable solvents are those which are still liquid under the usually low reaction temperatures and neither eliminate protons nor have free electron pairs. Examples of these are cyclic and acyclic alkanes, such as ethane, isopropane, n-propane, n-butane, isobutane, n-pentane and isomers of pentane, cyclopentane, n-hexane and hexane isomers, n-heptane and heptane isomers and alkyl-substituted cyclohexanes. Mixtures of these nonpolar solvents with halogenated hydrocarbons, such as methyl chloride, dichloromethane, ethyl chloride, dichloroethanes and neopentyl chlorides, are preferably used. This makes it possible to adjust the polarity of the solvent in the desired manner. A higher polarity of the solvent generally results in a higher reaction rate. Conversely, the solubility of the polymers improves with a reduction in the polarity. Moreover, a lower solvent polarity results in a lower transfer probability and hence high uniformity of the polymer.

Before they are used in the living cationic polymerization, the starting materials, i.e. the monomers and the solvents, are subject to purification and drying. Sufficient drying of the monomers and of the solvents can be effected, for example, by treatment with dry molecular sieves or anhydrous alumina. The monomers are preferably dried over molecular sieves 3A and/or alumina at below 200° C. The solvents are as a rule subjected beforehand to preliminary purification over ion exchangers or by washing with sulfuric acid or with sodium hydroxide solution.

For the preparation of the block copolymers of the formula II, as a rule isobutene or monomer mixtures essentially containing obutene are first reacted in one of the abovementioned solvents in the presence of the abovementioned coinitiators and Lewis acids at below 0° C., preferably from −20 to −120° C., in particular from −50 to −100° C., until the desired conversion of the isobutene has been reached. The vinylaromatic monomers are then added for producing the polymer blocks B. During or after the addition of the vinylaromatic monomers, the reaction temperature can be maintained or, depending on the reactivity of the vinylaromatic monomers, increased. In this case, the polymerization of the vinylaromatic monomers is carried out at above −50° C., for example at from −20 to +50° C. As a rule, the polymerization of the isobutene is continued to a conversion of at least 80%, preferably at least 90%, before the vinylaromatic monomers are added. The vinylaromatic monomers are preferably added before 99%, in particular before 98%, of the isobutene has been converted, since otherwise there is the danger that some of the reactive terminal groups will be deactivated. As a result of this procedure, a central polymer block essentially composed of isobutene units (or a plurality of polymer blocks A which are arranged around the radical X) first forms, said polymer block carrying at its ends polymer blocks B which are composed of vinylaromatic monomers and are essentially unsegmented, i.e. free of isobutene units.

The reaction can be carried out batchwise or semicontinuously (semibatch, feed process). However, the preparation is preferably carried out batchwise in conventional stirred kettles. At least some, preferably the total amount of, isobutene and solvent is preferably initially taken in the reaction vessel. Thereafter, the coinitiator and, if required, the cocatalyst in the Lewis acid, preferably in this order, are first added at the desired polymerization temperature and the isobutene polymerization is carried out with cooling to the desired conversion. The vinylaromatic monomers are then added and if necessary the polymerization temperature is increased.

The heat of reaction can be removed in the usual manner, for example by internal or external cooling units and/or evaporative cooling.

Workup can be effected in a conventional manner, first the Lewis acid being decomposed with water or with alcohols, e.g. isopropanol, and workup then being effected in an aqueous medium by extraction. It has proven advantageous if, after the reaction has been stopped, the solvent or solvent mixture used for the reaction is first replaced by an aromatic hydrocarbon in order to achieve a clear phase separation. As a rule, the organic phase or the crude product isolated therefrom is subjected to an aftertreatment with dry alumina, water, halogens, such as chloride, organic halogen compounds and tert-butanol being removed.

The block copolymer obtainable according to the invention can be used directly as sealing material or can be compounded with the conventional additives. The novel block copolymers, in particular the block copolymes of the formula I, are distinguished by high water vapor and gas tightness which, in spite of the polystyrene blocks, is comparable with that of isobutene. The novel block copolymers are extremely resilient and, in contrast to isobutene, have substantially higher tensile strength and a substantially higher surface hardness. Furthermore, the block copolymers exhibit thermoplastic behavior, which permits simple processing, for example by melt extrusion.

Investigation of the novel block copolymers by means of DSC (differential scanning calorimetry) shows a narrow, glassy transition above 90° C., which indicates substantially unsegmented polymer blocks B.

Owing to these properties, the novel block copolymers are particularly suitable for the production of resilient sealing materials or sealing compounds for a large number of applications.

The novel block copolymers can be used as such as sealing materials. However, depending on the application, the novel sealing materials can be used for the preparation of sealing compounds which, in addition to the novel sealing materials, contain conventional additives, for example UV stabilizers and processing assistants and/or fillers in the amounts customary for sealing compounds. In particular, such sealing compounds based on the novel sealing material may contain up to 40, preferably up to 20, % by weight of conventional fillers, e.g. carbon blacks, metal powder, inorganic or organic pigments and other fillers. Suitable additives and fillers are known to a person skilled in the art. These are fillers as usually used in sealing compounds based on silicone rubbers, butyl rubbers or polysulfide.

Owing to their property profile, the novel flexible sealing material or sealing compounds prepared therefrom are particularly suitable for sealing the edge joints of insulation glass panes. Accordingly, the present invention also relates to the use of the novel block copolymers in sealing compounds for sealing edge joints in insulation glass panes. It also relates to insulation glass panes having an edge joint seal which contains, as flexible sealing material, one of the block copolymers described above. Insulation glass panes which are provided with such edge joint seals are distinguished by a longer life, in particular with respect to the undesired penetration of traces of moisture into the spaces present between the glass panes.

In FIG. 1, an insulation glass pane is illustrated by way of example. In the arrangement shown, the insulation glass pane has, as a spacer, a hollow aluminum profile which is arranged between two glass panes (1) and connected to the glass panes (1) by an adhesive bond (3). The adhesive bond (3) can be effected by means of a polyisobutene of the prior art or by means of a novel block copolymer. The hollow aluminum profile (2) may contain a drying agent (4). In this case, the hollow profile (2) has orifices (5), for example in the form of holes or slots, in the surfaces, which openings form the boundary with the cavity present between the glass panes. Furthermore, such insulation glass panes have a flexible covering (6) of the edge joints formed from the hollow profile (2) and the panes (1). The novel sealing materials are used as material for the covering (6) of the edge joints.

The composite panes thus obtained are distinguished by improved mechanical stability and greater stability to the penetration of atmospheric humidity into the space between the panes.

Owing to the particular property profile of the novel sealing materials, i.e. their low gas permeability and their high mechanical strength, the expensive hollow aluminum profile can be dispensed with. Accordingly, a further novel embodiment relates to those insulation glass panes which have any desired spacer, for example of plastics, instead of the hollow aluminum profile. This spacer is embedded directly in the edge joint seal comprising the novel sealing materials. An adhesive bond with the glass pane can be dispensed with. Consequently, the traditional arrangement comprising a hollow aluminum profile as a spacer is simplified. Moreover, the omission of the hollow aluminum profile leads to improve heat insulation of the panes. Owing to the high water vapor permeability, it has to date been impossible to dispense with a hollow aluminum profile when conventional sealing materials are used as edge joint seals.

EXAMPLES

1. Analysis

The molecular weight was determined by means of GPC against polyisobutene standard and against a polystyrene calibration file in the manner described above.

Determination of the solution viscosity: for this purpose, the viscosity was determined according to Ubbelohde (capillary diameter 0.01 mm) at 20° C. in isooctane (1 g of polymer in 100 ml) according to DIN 51562.

Determination of the mechanical properties:
a) Hardness test: the Shore A hardness (DIN 53505) was determined.
b) In the tensile test according to DIN 53504, the tensile strength σmax and the maximum extensibility $\epsilon$-$F_{max}$ were determined on 1.04 mm thick and 4 mm wide test specimens.

The water vapor permeability was determined according to ASTM F-1249 and the permeability to argon according to DIN 53380, using films having a thickness of 237 μm.

2. Preparation of the Novel Block Copolymers (Example 1)

Two dropping funnels having a capacity of 1 l each are placed on a 2 l four-necked flask with magnetic stirrer and dry ice cooling. A bed of dry molecular sieve 3A (dried for 16 h at 2 mbar/150° C.) is present over glass wool in both dropping funnels. In one of the dropping funnels, a layer of 250 g of dry, acidic ion exchanger (Lewatit SPC 118) is placed. over the molecular sieve. Here, a mixture comprising 600 ml of methylene chloride and 600 ml of hexane and cooled to −78° C. is poured on so that molecular sieve and ion exchanger are flooded and the total solvent is present in the reaction flask after 30 minutes. The other dropping funnel is provided with a dry ice cooler, by means of which 8 mol of isobutene dried at −78° C. over molecular sieve 3A with an average residence time of 15 min are introduced by condensation. The isobutene feed is effected in the case of the flooded molecular sieve in such a way that all isobutene is in the flask after 25 minutes. Thereafter, 2 mmol of dry 2,6-di-tert-butylpyridine and 5 mmol of dicumyl chloride are added by means of a syringe via a septum and cooling to −70° C. is effected by means of dry ice. 60 mmol of $TiCl_4$ are then added via the septum with vigorous stirring, no temperature increase (polymerization) being detectable under these conditions. After 4 hours, a sample is taken and 0.4 mol of styrene is added via the isobutene purification under the same feed conditions as isobutene, after which the reaction mixture is heated to 20° C., the reaction is stopped after 30 min by adding 1 mol of isopropanol, 300 ml of toluene are added and the mixture is transferred to a separating funnel, washed 3 times with 200 ml of water and distilled at 200° C. to 2 mbar. 260 g of polymer are obtained and are dissolved in toluene, poured onto silicone paper and dried in a drying oven at 140° C. and under a reduced pressure of 30 mbar to give a film.

Before the addition of styrene, a sample of the reaction mixture was taken and was analyzed with respect to its molecular weight: the number-average molecular weight $M_n$ was 43,000 dalton and the peak maximum $M_p$ was 44,000 dalton. The molecular weight distribution $M_w/M_n$ was 1.18.

The solution viscosity of the block copolymer was 1.12 $mm^2$/second.

For the block colpolmer, a glass transition was determined at 95° C. by menas of DSC.

9. Shore A hardness: 39.2
σmax: 6.5 $N/mm^2$ $\epsilon$-$F_{max}$: 500%
Chlorine content (by elemental analysis): 19 ppm
Permeability to water: 0.35 $g/(m^2·d)$
Permeability to argon: 135 $g/(m^2·d)$

We claim:

1. A method of sealing a joint by applying a resillient sealing material to the joint, wherein the sealing material consists of at least one linear or star block copolymer alone or together with customary additives for this purpose selected from processing assistants, UV stabilizers and fillers, in a amount of up to 40% by weight, wherein the block copolymer comprises at least one polymer block A which is essentially composed of isobutene units and at least two polymer blocks B which are essentially composed of units which are derived from vinylaromatic monomers and conform to the general formula I

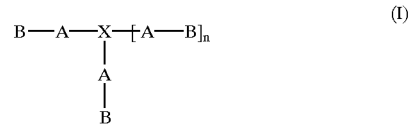

(I)

where

A is a polymer block A,

B is a polymer block B.

n is 0, 1 or 2 and

X is a single bond or an n+2-valent hydrocarbon radial of up to 30 carbon atoms, wherein the sum of the number-average molecular weights of all polymer blocks A is from 30,000 to 80,000 daltons, wherein each of the polymer blocks B has a number-average molecular weight $M_n$ of from 6000 to 20,000 daltons, and wherein the ratio of the total weight of all polymer blocks A to the total weight of all polymer blocks B is from 3:2 to 4:1.

2. The method as claimed in claim 1, wherein the polymer blocks A contain up to 20% by weight, based on the total weight of all polymer blocks A, of monoolefinically unsaturated monomers having trialkylsilyl groups as polymerized units.

3. The method as claimed in claim 1, wherein the vinylaromatic monomers are selected from styrene and p-methylstyrene.

4. The method as claimed in claim 1, wherein X is one of the following radicals:

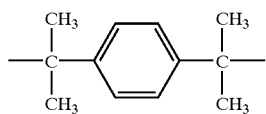 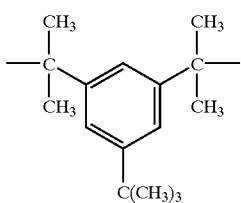

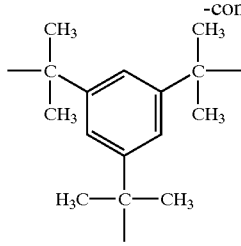 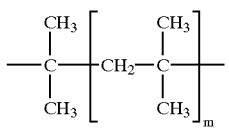

where m is 1, 2 or 3.

5. The method as claimed in claim 1, wherein the joints to be sealed are the edge joints of insulation glass panes.

6. An insulation glass pane having a flexible edge joint seal which cotains at least one block copolymer as defined in claim 1.

* * * * *